W. H. DUNDORE.
VEHICLE WHEEL.
APPLICATION FILED JULY 22, 1920.
1,400,807.
Patented Dec. 20, 1921.
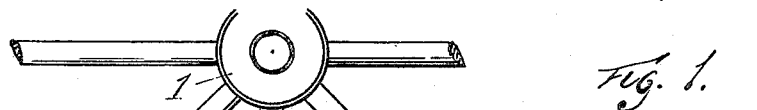
Fig. 1.
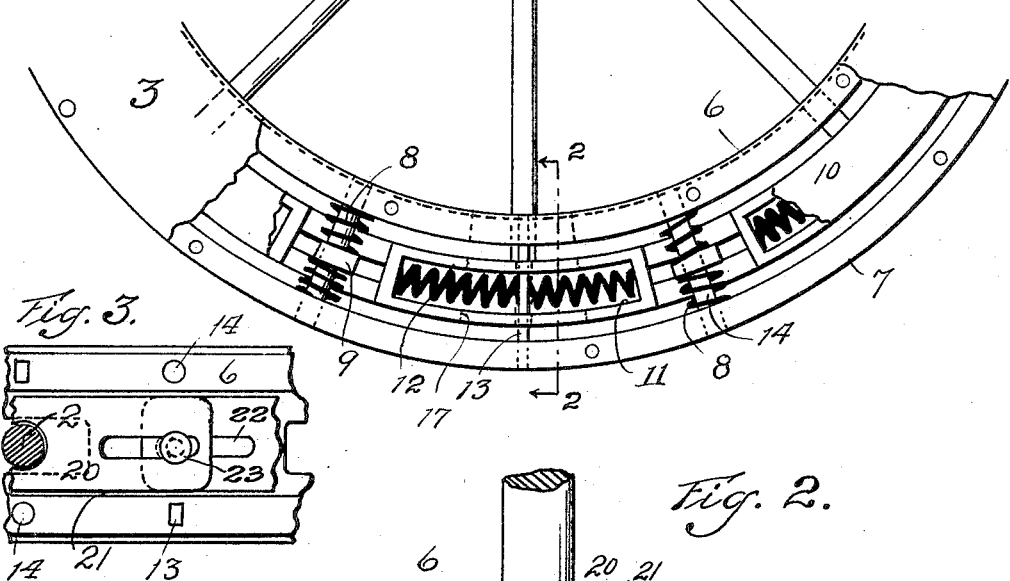
Fig. 3.
Fig. 2.
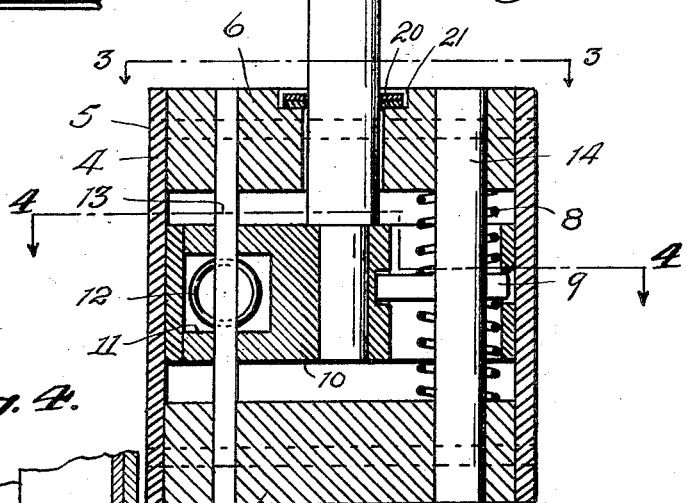
Fig. 4.
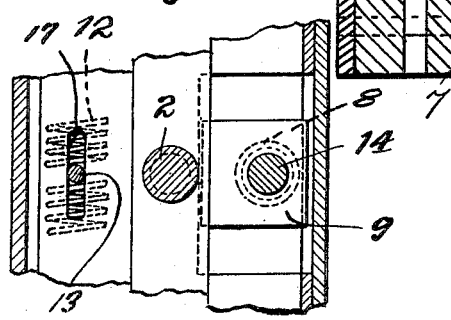
William H. Dundore, Inventor
By [signature] Attorney

UNITED STATES PATENT OFFICE.

WILLIAM H. DUNDORE, OF READING, PENNSYLVANIA.

VEHICLE-WHEEL.

1,400,807.   Specification of Letters Patent.   Patented Dec. 20, 1921.

Application filed July 22, 1920. Serial No. 398,238.

*To all whom it may concern:*

Be it known that I, WILLIAM H. DUNDORE, a citizen of the United States, residing at Reading, in the county of Berks and State of Pennsylvania, have invented certain new and useful Improvements in Vehicle-Wheels, of which the following is a specification.

This invention relates to improvements in vehicle wheels, of the type commonly known as resilient wheels, and the object in the present invention is to provide a wheel in which the proper resiliency is assured, without the use of rubber or other material in which deterioration takes place.

The invention consists in providing a wheel tire of metal, in which is located a series of springs, adapted to provide for movement of the parts in different directions, and to so distribute the weight on the wheel that no one spring will be unduly strained.

The invention is more fully described in the following specification and clearly illustrated in the accompanying drawing, in which:—

Figure 1 is a side elevational view of a portion of a wheel, with portions of the tire cut away, showing the arrangement of the interior of the tire and the positions of the springs and other parts.

Fig. 2 is a sectional view, somewhat enlarged, taken through line 2—2 of Fig. 1.

Fig. 3 is a plan view taken in line 3—3 of Fig. 2, showing the inner surface of the tire with the slide plates showing.

Fig. 4 is a sectional view taken on line 4—4 of Fig. 2.

The numeral 1 designates the hub and 2 the spokes of a wheel. 3 designates the tire thereof.

The tire is made up of two outside plates 4, one on either side and adapted to be held in position by suitable means such as bolts 5, which pass through the tire.

The tire proper is made up of two rings 6 and 7, the latter forming the tread member. Between these two rings I have mounted a series of radially arranged springs 8, arranged in pairs and seated against opposite sides of a flat member 9, and these springs bear against the inner surfaces of the said two rings, while the flat member 9 is slidably secured to a central, annular ring member 10, so located with relation to the inner and outer rings 6 and 7, as to permit a space for movement between said inner and outer rings.

This central annular ring 10 is formed with a series of integral pockets 11, alternately arranged with relation to the flat members 9, and in each pocket I place a pair of springs 12, which are separated from each other by rods 13.

These rods 13, as well as the rods 14 on which the radially arranged springs 8 are mounted, pass through both the inner and outer rings 6 and 7 as well as through the central ring 10, and when pressure is placed upon the hub of the wheel, the entire central ring with the flat members 9 will move on these rods 13 and 14, the radially arranged springs being compressed by the direct movement of the hub and spokes in a downward direction, while the annularly arranged springs on the horizontal line drawn through the hub center, will also be compressed, and this movement of the annularly arranged springs is possible because of the slots 17 in the wall of the pocket 11, the pockets being rigid with the spokes and movable relative to the rims. The rods 14 are rigidly secured to both the inner and outer rims 6 and 7 respectively, and pass through perforations in the flat members 9, and the springs 8 are located on each side of the flat members 9 and bear against said members and the inner surfaces of the rims 6 and 7, while the member 9 is slidable in the annular ring 10.

The inner ring 6 of the tire, at the points where the spokes 2 pass through it, is perforated and these perforations are larger than the diameter of the spokes, so as to permit a loose fit between the spokes and the openings, and a pair of slides 20 are arranged in a depression 21 in the inner surface of the inner ring and these slides are also perforated to receive the spokes, which fit loosely in said perforations, as shown clearly in Fig. 3. These slides are provided with elongated slots 22 in which a pin 23 moves, so that, when pressure is placed upon the wheel, the spokes leading horizontally from the hub will be permitted to move with relation to the inner ring, and allow the annularly arranged springs at these points, to assume a portion of the duty of easing the load.

It will be noted therefore, that the resiliency is obtained both from the radially arranged and the annularly arranged springs at the same time, and, in order to equalize the strain, I have arranged the series of springs 8 and 12, not only alternately on each side of the wheel, but so that each radial spring is opposed by an annular spring.

Having thus described my invention, what I claim and desire to secure by Letters Patent is:—

1. In a resilient vehicle wheel, the combination of a tire having a central annular opening, said tire being formed of an inner ring member, an outer ring member and two side annular plates, with a hub having spokes, and an annular ring member carried by the outer ends of the spokes, said annular ring lying in the annular opening of the tire; a series of radially arranged springs carried by the said annular ring member and bearing against the surfaces of the inner and outer tire members; a series of circumferential springs alternately arranged and located within the said annular ring; flat members slidably located in the annular ring member and upon which the radially arranged springs are mounted, said annular ring having pockets to house the circumferential springs and rods passing through the inner and outer tire members and against which the circumferential springs bear.

2. In a vehicle wheel, a tire having a tread portion, an inner ring member, plates on both sides of the tread and inner ring member, an annular ring located between the tread and the inner ring member, radially arranged and circumferentially arranged springs carried by said annular ring; flat members slidably engaging the annular ring against which the radially arranged springs are seated, said annular ring having pockets to house the circumferential springs, rods against which the circumferential springs bear, said annular ring carrying the spokes and hub of the wheel and adapted to move relatively to the tread and the inner ring member.

In testimony whereof I affix my signature.

WILLIAM H. DUNDORE.